(12) United States Patent
Chen et al.

(10) Patent No.: US 7,545,562 B2
(45) Date of Patent: Jun. 9, 2009

(54) COMMON-APERTURE OPTICAL SYSTEM INCORPORATING A LIGHT SENSOR AND A LIGHT SOURCE

(75) Inventors: Chungte W. Chen, Irvine, CA (US); J. Steve Anderson, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 39 days.

(21) Appl. No.: 11/703,312

(22) Filed: Feb. 7, 2007

(65) Prior Publication Data

US 2008/0186568 A1    Aug. 7, 2008

(51) Int. Cl.
*G02B 23/00* (2006.01)
*G02B 27/14* (2006.01)

(52) U.S. Cl. .................. 359/399; 359/364; 359/637

(58) Field of Classification Search ......... 359/362–367, 359/725–732, 850–861, 618–641
See application file for complete search history.

(56) References Cited

U.S. PATENT DOCUMENTS

| | | | | |
|---|---|---|---|---|
| 5,144,496 A | * | 9/1992 | Kashima | 359/859 |
| 5,200,622 A | * | 4/1993 | Rouchon et al. | 250/334 |
| 5,422,746 A | * | 6/1995 | Aharoni et al. | 359/16 |
| 5,517,016 A | * | 5/1996 | Lesh et al. | 250/201.1 |
| 5,729,376 A | * | 3/1998 | Hall et al. | 359/366 |
| 5,847,879 A | * | 12/1998 | Cook | 359/631 |
| 5,880,834 A | * | 3/1999 | Chrisp | 356/328 |
| 6,072,572 A | | 6/2000 | Hatfield et al. | |
| 6,396,647 B1 | * | 5/2002 | Chen | 359/738 |
| 6,469,815 B1 | | 10/2002 | Poon et al. | |
| 6,522,440 B1 | | 2/2003 | Poon et al. | |
| 6,590,685 B1 | | 7/2003 | Mendenhall et al. | |
| 6,741,341 B2 | | 5/2004 | DeFlumere | |
| 2003/0137645 A1 | | 7/2003 | Fluckiger | |
| 2004/0004155 A1 | | 1/2004 | DeFlumere et al. | |
| 2004/0021852 A1 | | 2/2004 | DeFlumere | |
| 2004/0119020 A1 | | 6/2004 | Bodkin | |
| 2004/0151504 A1 | | 8/2004 | Triebes et al. | |

FOREIGN PATENT DOCUMENTS

GB    940 839 A    11/1963
GB    1 126 817 A    9/1968

* cited by examiner

*Primary Examiner*—Thong Nguyen
(74) *Attorney, Agent, or Firm*—Leonard A. Alkov

(57) ABSTRACT

A common-aperture optical system includes a reflective telescope having a common boresight, an entrance pupil, an exit pupil, and a beam path extending from the entrance pupil to and beyond the exit pupil. A beam splitter intersects the beam path so that the beam path is incident upon the beam splitter. A light sensor is positioned to receive an input light beam traveling along the beam path after the beam path intersects the beam splitter and passes the exit pupil of the reflective telescope. A light source produces an output light beam incident upon the beam splitter and positioned to inject the output light beam into an inverse of the beam path and toward the entrance pupil of the reflective telescope. A diverger corrects at least one of the input light beam and the output light beam.

19 Claims, 3 Drawing Sheets

COMMON-APERTURE OPTICAL SYSTEM INCORPORATING A LIGHT SENSOR AND A LIGHT SOURCE

This invention relates to an optical system and, more particularly, to an optical system in which a light sensor and a light source operate through the same optics and have a common boresight.

BACKGROUND OF THE INVENTION

If an optics system requires both the sensing of a target location in a scene by a light-sensitive sensor and the transmission of light to the same location, the boresights of the sensor and the transmitter must be accurately aligned. One possible approach is to use two separate telescopes, one to gather the light for the sensor and the other to direct the output light, and to maintain a fixed parallel boresight arrangement of the two telescopes. However, keeping the boresights of these two separate telescopes aligned and parallel is challenging, particularly in rugged conditions and in adverse environments such as those where the temperature changes significantly so that there are possible thermal expansion differences in the mounting structures of the telescopes. A small angular change between the boresights of the two telescopes translates into a large spatial separation if the target location is a large distance from the position of the optical system.

Another possible approach would be to use an optical system, having a single telescope and a common aperture, for the collection of light for the light sensor and the directing of light from the light source. While this single-telescope approach is appealing, it is difficult to implement where the character of the two optical signals is different. For example, if the light sensor is sensing an image of focused, relatively low-intensity light of a first wavelength, and the light source is afocally transmitting relatively high-intensity light of a second wavelength, such as in the case of a laser rangefinder or laser designator, it is difficult to combine the optics for the two applications into a single telescope.

There is a need for an approach to achieve highly precise aiming of an optical system that performs the dual functions of receiving light for a light sensor and transmitting light from a light source. The present invention fulfills this need, and further provides related advantages.

SUMMARY OF THE INVENTION

The present approach provides an apparatus and technique for achieving precise boresight alignment of an input light beam to a light sensor and an output light beam from a light source or transmitter. A common aperture telescope is used for both the incoming and outgoing beams. An injection technique allows the outgoing output light beam to be injected along the beam path. The common aperture optical system is more compact, lighter, and less expensive than a two-aperture optical system to perform the same functions, and also maintains its alignment under a wide variety of conditions. The use of reflective optics in the common aperture telescope avoids chromatic aberration when the incoming and outgoing beams are of significantly different wavelengths, as is often the case.

In accordance with the invention, a common-aperture optical system comprises a reflective telescope having a common boresight, an entrance pupil, an exit pupil, and a beam path extending from the entrance pupil to and beyond the exit pupil. A beam splitter intersects the beam path so that the beam path is incident upon the beam splitter. A light sensor is positioned to receive an input light beam traveling along the beam path after the beam path intersects the beam splitter and passes the exit pupil of the reflective telescope. A light source produces an output light beam that is incident upon the beam splitter and positioned to inject the output light beam into an inverse of the beam path and toward the entrance pupil of the reflective telescope. In the usual case, the light source operates at a first wavelength, and the light sensor operates at a second wavelength different from the first wavelength. However, the light source may operate at the same wavelength as the light sensor. A diverger corrects at least one of the input light beam and the output light beam.

Preferably, the reflective telescope includes at least two mirrors. The beam splitter is positioned along the beam path between two mirrors of the reflective telescope. In the preferred configuration, the input light beam reflects from the beam splitter, and the output light beam passes through the beam splitter. The diverger, which is preferably a diverger lens but may be a reflective diverger, corrects the output light beam. Most preferably, the reflective telescope is a three-mirror afocal telescope having a primary mirror, a secondary mirror, and a tertiary mirror, and the beam splitter is positioned along the beam path between the secondary mirror and the tertiary mirror. In one embodiment, the light sensor is an infrared light sensor, and the light source is a laser.

More specifically, a common-aperture optical system comprises a reflective telescope having a common boresight, an entrance pupil, an exit pupil, and a beam path extending from the entrance pupil to and beyond the exit pupil. The reflective telescope includes at least two mirrors. A beam splitter intersects the beam path so that the beam path reflects from a front side of the beam splitter. The beam splitter is positioned along the beam path between two mirrors of the reflective telescope. An infrared light sensor is positioned to receive an input light beam traveling along the beam path after the beam path reflects from the front side of the beam splitter and passes the exit pupil of the reflective telescope. A laser light source produces an output light beam incident upon a back side of the beam splitter and is positioned to inject the output light beam into an inverse of the beam path and toward the entrance pupil of the reflective telescope. A diverger lens corrects the output light beam. The diverger lens is disposed between the laser light source and the back side of the beam splitter. Other compatible features discussed herein may be used with this embodiment.

Even more preferably, a common-aperture optical system comprises a reflective telescope having a common boresight, an entrance pupil, an exit pupil, and a beam path extending from the entrance pupil to and beyond the exit pupil. The reflective telescope is a three-mirror afocal telescope having a primary mirror, a secondary mirror, and a tertiary mirror. The field of view for the three-mirror afocal telescope is wide, and the size of a folded three-mirror afocal telescope is quite compact. A beam splitter, preferably a dichroic beam splitter, intersects the beam path so that the beam path reflects from a front side of the beam splitter. The beam splitter is positioned along the beam path between the secondary mirror and the tertiary mirror. An infrared light sensor is positioned to receive an input light beam traveling along the beam path after the beam path reflects from the front side of the beam splitter and reflects from the tertiary mirror. A laser light source produces an output light beam incident upon a back side of the beam splitter and is positioned to inject the output light beam into an inverse of the beam path and toward the entrance pupil of the reflective telescope. The output light beam reflects from the secondary mirror and the primary mirror after passing through the beam splitter. A diverger lens corrects the output light beam. The diverger lens is disposed between the laser light source and the back side of the beam splitter. Other compatible features discussed herein may be used with this embodiment.

With this design, the output light beam is injected into the inverse of the beam path between the secondary mirror and the tertiary mirror of the reflective telescope. The diverger lens converts the collimated laser output light beam into a diverging beam to correspond to the divergence of the inverse of the beam path at the location of the injection. The divergence of the laser beam is preferably matched to the full size of the light beam at the point of injection and thence to the numerical aperture of the primary-secondary mirror pair of the telescope. In this preferred approach, the output light beam is expanded to the full numerical aperture of the telescope, reducing the potential for air breakdown that may otherwise occur with a high-power-density laser beam.

The diverger is preferably designed to correct any astigmatism introduced by the beam splitter.

The present approach provides an optical system that is used to receive an input light beam that is imaged, and transmit an output afocal light beam through a single telescope having an aperture that is common to the input light beam and the output light beam. The input light beam and the output light beam are therefore necessarily aligned along a common boresight. This configuration avoids any misalignment that might otherwise occur during service. Because the output light beam may use the entire aperture of the telescope, the beam divergence of the output light beam is smaller, as much as a factor of two as compared with alternative approaches. This advantage is particularly important when there is a very limited aperture size for the laser light source path through the telescope in order to meet the constraints of package size. It would be difficult to have a laser source aperture size greater than half the sensor aperture size. This optical system is also physically smaller and lighter in weight than alternatives that use different telescopes for the two light beams.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
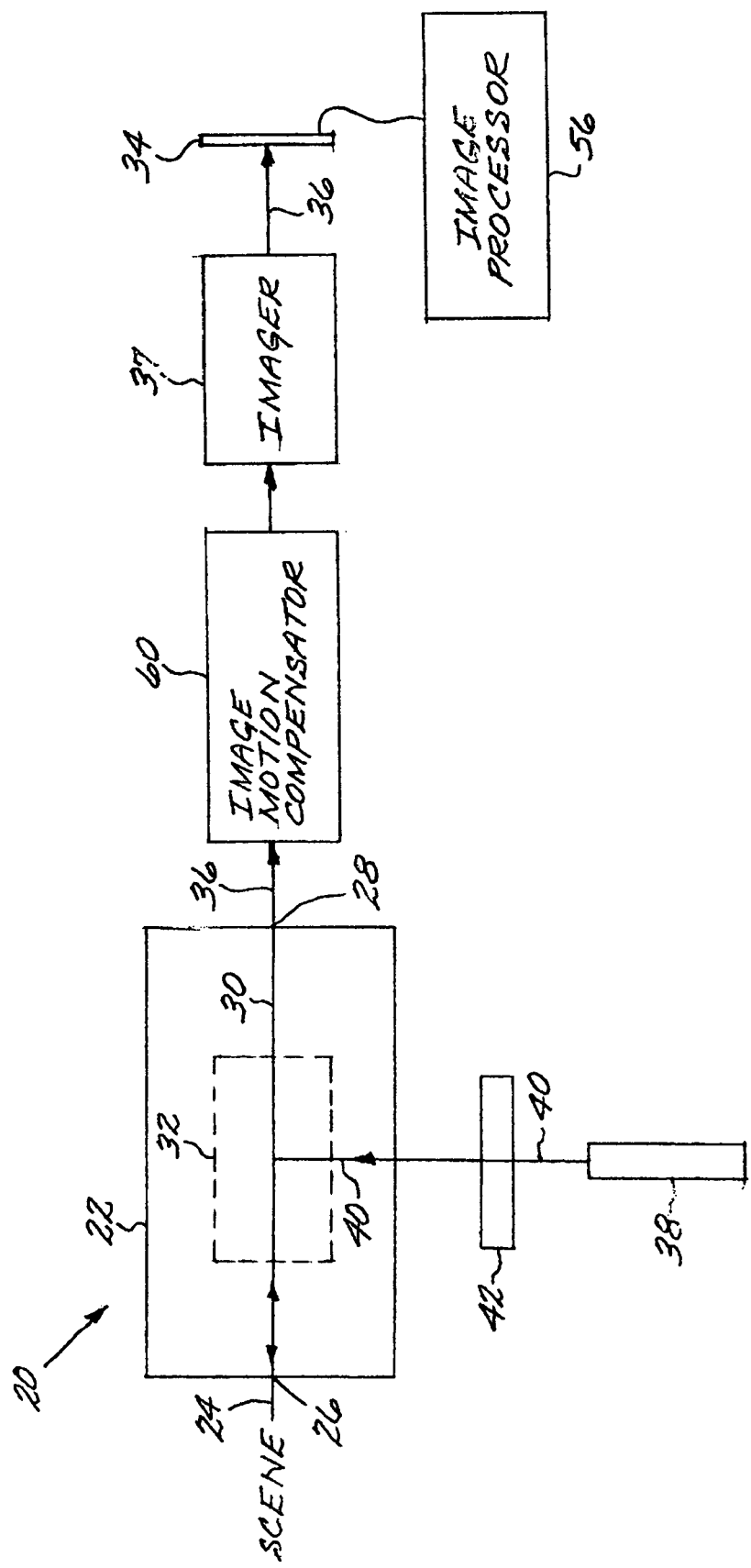
FIG. 1 is a block diagram of one embodiment of a common-aperture optical system.

FIG. 1 depicts in block-diagram form a preferred form of a common-aperture optical system 20. The common-aperture optical system 20 includes a reflective telescope 22 having a common boresight 24, an entrance pupil 26 of the reflective telescope 22, an exit pupil 28 of the reflective telescope 22, and a beam path 30 extending from the entrance pupil 26 to and beyond the exit pupil 28. A beam splitter 32 intersects the beam path 30 so that the beam path 30 is incident upon the beam splitter 32. A light sensor 34, preferably an imaging light sensor 34, is positioned to receive an input light beam 36 traveling along the beam path 30 after the beam path 30 intersects the beam splitter 32 and passes the exit pupil 28 of the reflective telescope 22. The output of the light sensor 34 is provided to an image processor 56. Preferably but not necessarily, an image motion compensator 60 is placed at or near the exit pupil 28 in the collimated beam space before the input light beam 36 reaches the light sensor 34. The image motion compensator 60 is preferably a mirror that tilts in two axes. If the image motion compensator 60 is not placed in the collimated beam space, the image plane will rotate when the mirror of the image motion compensator 60 tilts. For those configurations where the reflective telescope does not itself image the input light beam 36, the input light beam 36 is imaged by an imager 37 onto the imaging light sensor 34. The imager 37 is of conventional design and may be based on refractive or reflective components, or contain both refractive and reflective components.

A light source 38 produces an output light beam 40 that is incident upon the beam splitter 32 and positioned to inject the output light beam 40 into an intermediate location along an inverse of the beam path 30 and toward the entrance pupil 26 of the reflective telescope 22. (The beam path 30 is a set of vectors extending in the direction from the entrance pupil 26 toward the exit pupil 28. The inverse of the beam path 30 is a set of vectors extending in the opposite direction.) A diverger 42 corrects at least one of the input light beam 36 and the output light beam 40, in this case the output light beam 40 before it is incident upon the beam splitter 32.

Figure 2:
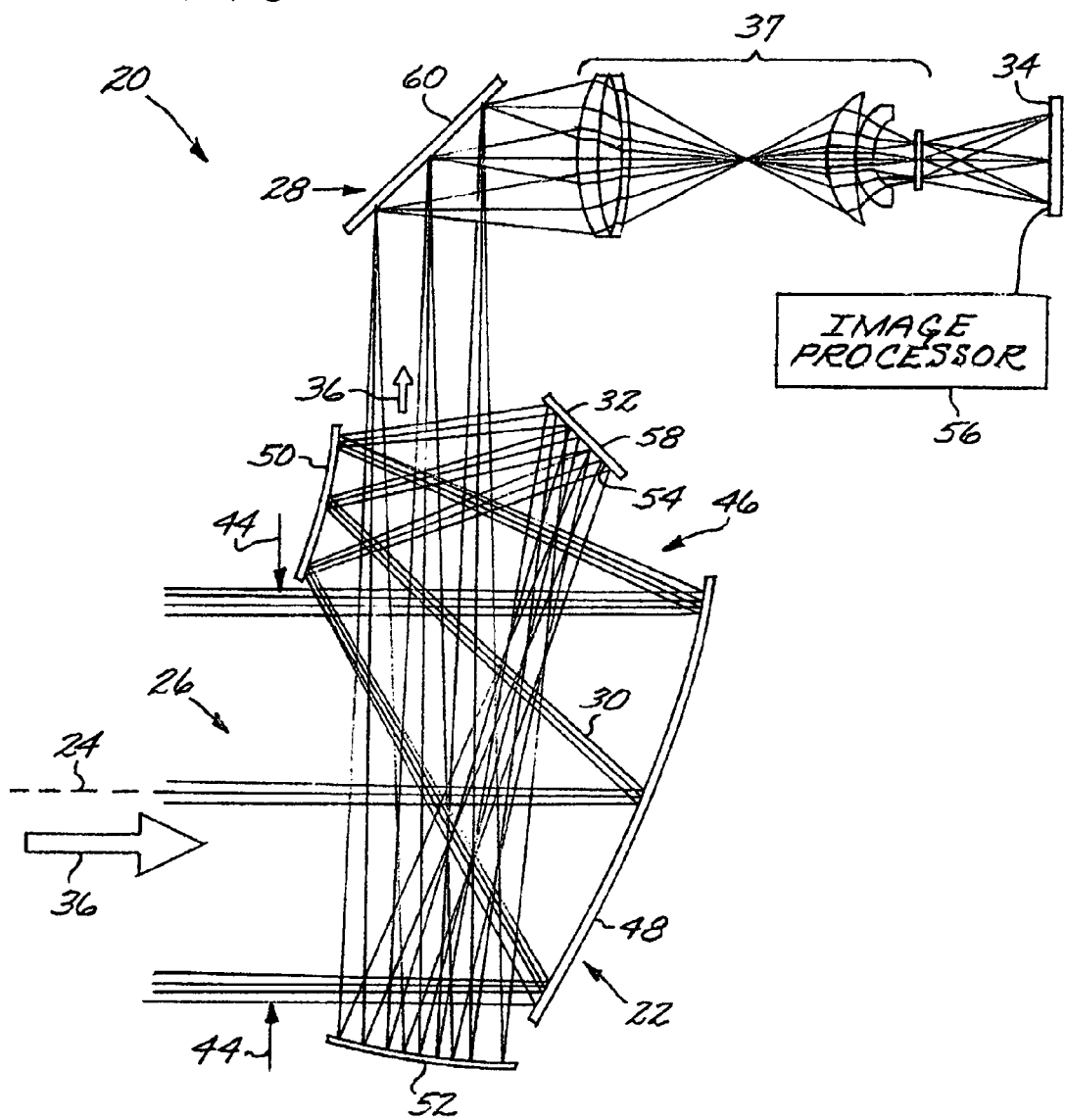
FIG. 2 is a schematic ray-path drawing of a preferred embodiment of the optical system of FIG. 1, illustrating the input light beam path through the three-mirror afocal telescope.
Figure 3:
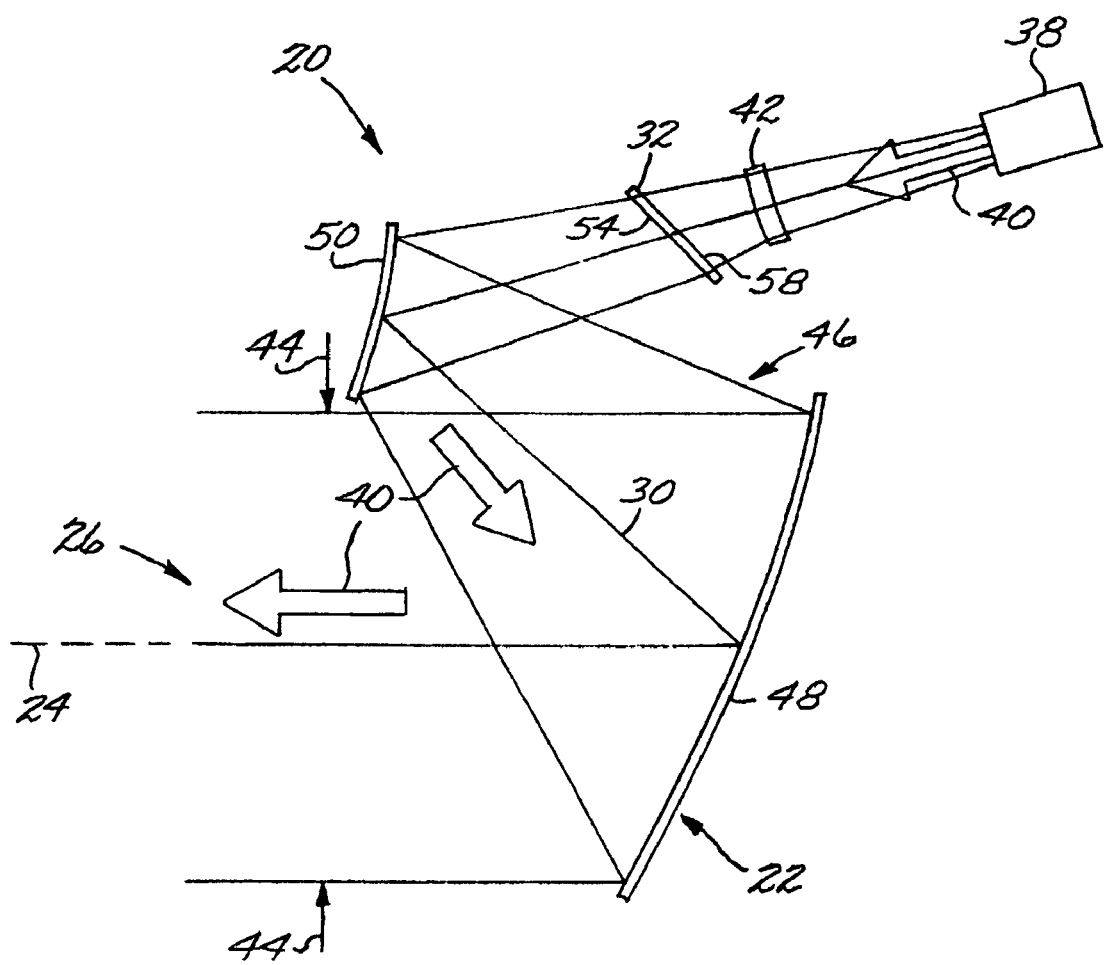
FIG. 3 is a schematic ray-path drawing of a preferred embodiment of the optical system of FIG. 1, illustrating the output light beam path through a portion of the three-mirror afocal telescope.

FIGS. 2-3 illustrate a preferred physical embodiment of the common-aperture optical system 20. Elements common to the embodiment of FIG. 1 are assigned the same reference numerals, and the prior discussion is incorporated. FIG. 2 includes only the optical components associated with the input light beam 36, and FIG. 3 includes only the optical components associated with the output light beam 40. Some of the components are common to the input and output functions, and are shown in both FIGS. 2 and 3.

In the embodiment of FIGS. 2-3, the common-aperture optical system 20 includes the reflective telescope 22 having the common boresight 24 and a common aperture 44. As used herein, "common" means that the element is the same for the portion of the optical system 20 that processes the input light beam 36 and the portion of the optical system 20 that processes the output light beam 40. The reflective telescope 22 of this embodiment is a three-mirror afocal telescope 46 having a primary mirror 48, a secondary mirror 50, and a tertiary mirror 52. The three-mirror afocal telescope 46 as illustrated is of a folded, compact configuration. The tertiary mirror 52 is not used to process the output light beam 40, and is not shown in FIG. 3. Other types of telescopes may also be used, employing the optical design principles discussed herein.

Referring to FIG. 2, the beam splitter 32 intersects the beam path 30 so that the beam path 30 reflects from a flat, unpowered front side 54 of the beam splitter 32. The beam splitter 32 is preferably a dichroic beam splitter. The beam splitter 32 is positioned along the beam path 30 between two mirrors of the three-mirror afocal telescope 46, and specifically between the secondary mirror 50 and the tertiary mirror 52. The beam path 30 entering the entrance pupil 26 of the reflective telescope 22 reflects from the primary mirror 48, reflects from the secondary mirror 50, reflects from the front side 54 of the beam splitter 32, reflects from the tertiary mirror 52, exits the exit pupil 28 of the reflective telescope 22, and is imaged onto the imaging light sensor 34 by the imager 37, after reflecting from the optional image motion compensator 60.

The light sensor 34 is positioned to receive the input light beam 36 traveling along the beam path 30 after the beam path 36 reflects from the front side 54 of the beam splitter 32, reflects from the tertiary mirror 52, and exits the exit pupil 28 of the reflective telescope 22. The light sensor 34 is preferably a pixelated imaging light sensor such as a focal plane array, which converts the incident light to electrical signals on a pixel-by-pixel basis, and provides the electrical signals to the image processor 56. The light sensor 34 may be selected to be sensitive to any wavelength of interest. As used herein, "wavelength" includes a single wavelength or a range of wavelengths. The light sensor 34 may be sensitive, for example, to any portion of the ultraviolet, visible, or infrared wavelengths.

Referring to FIG. 3, the light source 38 may be of any operable type and wavelength. In a typical application, the light sensor 34 is sensitive to light of a first wavelength and the light source 38 produces light of second wavelength that is different from the first wavelength. The light source 38 is preferably a laser light source that produces the output light beam 40. This output light beam 40 may be used for applications such as laser range finding or laser designating. The light source 38 may represent two lasers, one for laser range finding and one for laser designating, and more than two lasers may be present for some applications.

The output light beam 40 is incident upon an unpowered back side 58, opposite to the front side 54, of the beam splitter 32. The light source 38 is positioned to inject the output light beam 40 into an inverse of the beam path 30, toward the entrance pupil 26 of the reflective telescope 22. The output light beam 40 reflects from the secondary mirror 50 and then from the primary mirror 48 after passing through the beam splitter 32. That is, the output light beam 40 travels oppositely to the input light beam 36 over the portion of the reflective telescope 22 from the beam splitter 32 to the secondary mirror 50 to the primary mirror 48 and thence out the entrance pupil 26 of the reflective telescope 22 along the common boresight 24.

The output light beam 40 produced by a typical light source 38, such as a laser light source 38, is a parallel beam. But, as may be seen in FIGS. 2-3, the beam path 30 associated with the primary mirror 48 and the secondary mirror 50 of the three-mirror afocal telescope 46 is a converging beam at the location where the beam path 30 is incident upon the beam splitter 32.

If the parallel beam of the light source 38 is injected along the inverse of the beam path 30 at the beam splitter 32 (the beam path 30 is converging in the input direction when it is incident upon the beam splitter 32), it will not be properly diverging and will not fill the common aperture 44 properly as a parallel beam. To correct the output light beam 40, the diverger 42 is positioned between the light source 38 and the back side 58 of the beam splitter 32. The diverger 42 is preferably a refractive component such as a lens, although it could be a reflective component such as a mirror, a combination of refractive and reflective components, or a holographic optical element. The use of a lens is preferred, as it may be tailored to provide both divergence and aberration correction of the output light beam 40. The diverger 42 may be a lens set, including several lenses to accomplish different optical functions. Whether a single lens or multiple lenses of a lens set, the refractive diverger 42 is preferably made of a material that is achromatic for the wavelengths of the light source 38, if the light source 38 includes two or more different wavelengths such as those produced by a range finder laser and a designator laser.

The diverger 42 is selected to provide the proper divergence to the output light beam 40 after it passes through the beam splitter 32 to match the convergence of the beam path 30 at this point. The diverger 42 thus preferably includes at least one optical component of negative optical power to achieve the convergence of the beam path 30. The result is that, after the diverged output light beam 40 has reflected from the secondary mirror 50 and the primary mirror 48, the output light beam 40 that exits from the entrance pupil 26 of the reflective telescope 22 to match the numerical aperture and fill the common aperture 44, and is parallel to the common boresight 24. The filling of the common aperture 44 and the parallel output light beam 40 as it exits from the entrance pupil 26 also help to ensure that the output beam 40 does not focus at any point in or out of the telescope 22, so that the beam power density of the output light beam 40 is not so high as to cause breakdown of the air in the beam path 30.

The diverger 42 may also correct aberrations that are introduced into the output light beam 40 as it passes through the beam splitter 32. The diverger lens (set) 42 may include a cylindrical lens to correct astigmatism introduced by the beam splitter 32. The diverger lens (set) 42 may include decentered Schmidt plates to correct coma of the output light beam 40, if needed. The diverger lens (set) 42 may include at least one aspheric lens as well. The diverger lens 42 is thus used to correct the output light beam 40 to achieve the necessary divergence of the output light beam 40, and also to correct the output light beam 40 for any aberrations that may result from its passage through the beam splitter 32. In the absence of the diverger 42 or its equivalent, the common-aperture optical system 20 would not function properly.

The optical system 20 of the present invention thus provides a common aperture and common boresight for input and output light beams processed through a single telescope. The optical system 20 is compact and light in weight, and maintains its common boresight in all conditions and applications.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A common-aperture optical system, comprising:
    a reflective telescope having a common boresight, an entrance pupil, an exit pupil, and a beam path extending from the entrance pupil to and beyond the exit pupil, wherein the reflective telescope includes at least two mirrors;
    a beam splitter intersecting the beam path so that the beam path is incident upon the beam splitter, wherein the beam splitter is positioned along the beam path between two mirrors of the reflective telescope;
    a light sensor positioned to receive an input light beam traveling along the beam path after the beam path intersects the beam splitter and passes the exit pupil of the reflective telescope;
    a light source producing an output light beam that is incident upon the beam splitter and positioned to inject the output light beam into an inverse of the beam path and toward the entrance pupil of the reflective telescope; and
    a diverger to correct at least one of the input light beam and the output light beam.

2. The optical system of claim 1, wherein
the input light beam reflects from the beam splitter.

3. The optical system of claim 1, wherein
the output light beam passes through the beam splitter.

4. The optical system of claim 1, wherein
the output light beam passes through the beam splitter, and
the diverger corrects the output light beam.

5. The optical system of claim 1, wherein
the reflective telescope is a three-mirror afocal telescope having a primary mirror, a secondary mirror, and a tertiary mirror.

6. The optical system of claim 1, wherein the optical system further includes
an imager that images an output of the reflective telescope onto the light sensor.

7. The optical system of claim 1, wherein
the light sensor is an infrared light sensor, and
the light source is a laser.

8. The optical system of claim 1, wherein the diverger is a diverger lens.

9. The optical system of claim 1, wherein the diverger is a holographic optical element.

10. The optical system of claim 1, wherein the light source operates at a first wavelength, and the light sensor operates at a second wavelength different from the first wavelength.

11. The optical system of claim 1, wherein the diverger corrects aberrations in the at least one of the input light beam and the output light beam.

12. A common-aperture optical system, comprising:
a reflective telescope having a common boresight, an entrance pupil, an exit pupil, and a beam path extending from the entrance pupil to and beyond the exit pupil, wherein the reflective telescope is a three-mirror afocal telescope having a primary mirror, a secondary mirror, and a tertiary mirror;
a beam splitter intersecting the beam path so that the beam path is incident upon the beam splitter, wherein the beam splitter is positioned along the beam path between the secondary mirror and the tertiary mirror;
a light sensor positioned to receive an input light beam traveling along the beam path after the beam path intersects the beam splitter and passes the exit pupil of the reflective telescope;
a light source producing an output light beam that is incident upon the beam splitter and positioned to inject the output light beam into an inverse of the beam path and toward the entrance pupil of the reflective telescope, wherein the input light beam reflects from the beam splitter and the output light beam passes through the beam splitter; and
a diverger, wherein the diverger corrects the output light beam.

13. A common-aperture optical system, comprising:
a reflective telescope having a common boresight, an entrance pupil, an exit pupil, and a beam path extending from the entrance pupil to and beyond the exit pupil, wherein the reflective telescope includes at least two mirrors;
a beam splitter intersecting the beam path so that the beam path reflects from a front side of the beam splitter, wherein the beam splitter is positioned along the beam path between two mirrors of the reflective telescope;
an infrared light sensor positioned to receive an input light beam traveling along the beam path after the beam path reflects from the front side of the beam splitter and passes the exit pupil of the reflective telescope;
a laser light source producing an output light beam incident upon a back side of the beam splitter and positioned to inject the output light beam into an inverse of the beam path and toward the entrance pupil of the reflective telescope; and
a diverger lens to correct the output light beam, wherein the diverger lens is disposed between the laser light source and the back side of the beam splitter.

14. The optical system of claim 13, wherein
the reflective telescope is a three-mirror afocal telescope having a primary mirror, a secondary mirror, and a tertiary mirror.

15. The optical system of claim 13, wherein the optical system further includes
an imager that images an output of the reflective telescope onto the light sensor.

16. The optical system of claim 13, wherein
the reflective telescope is a three-mirror afocal telescope having a primary mirror, a secondary mirror, and a tertiary mirror,
the beam splitter is positioned along the beam path between the secondary mirror and the tertiary mirror.

17. The optical system of claim 13, wherein the light source operates at a first wavelength, and the light sensor operates at a second wavelength different from the first wavelength.

18. A common-aperture optical system, comprising:
a reflective telescope having a common boresight, an entrance pupil, an exit pupil, and a beam path extending from the entrance pupil to and beyond the exit pupil, wherein the reflective telescope is a three-mirror afocal telescope having a primary mirror, a secondary mirror, and a tertiary mirror;
a beam splitter intersecting the beam path so that the beam path reflects from a front side of the beam splitter, wherein the beam splitter is positioned along the beam path between the secondary mirror and the tertiary mirror;
an infrared light sensor positioned to receive an input light beam traveling along the beam path after the beam path reflects from the front side of the beam splitter and reflects from the tertiary mirror;
a laser light source producing an output light beam incident upon a back side of the beam splitter and positioned to inject the output light beam into an inverse of the beam path and toward the entrance pupil of the reflective telescope, wherein the output light beam reflects from the secondary mirror and the primary mirror after passing through the beam splitter; and
a diverger lens to correct the output light beam, wherein the diverger lens is disposed between the laser light source and the back side of the beam splitter.

19. The optical system of claim 18, wherein the light source operates at a first wavelength, and the light sensor operates at a second wavelength different from the first wavelength.

* * * * *